US012776132B2

(12) United States Patent
Luu et al.

(10) Patent No.: US 12,776,132 B2
(45) Date of Patent: Oct. 27, 2026

(54) AUTOMATICALLY DETECTING FALSE NEGATIVE OBJECTS IN 2D MATERIAL DETECTION DATA SETS

(71) Applicant: BOARD OF TRUSTEES OF THE UNIVERSITY OF ARKANSAS, Little Rock, AR (US)

(72) Inventors: Khoa Luu, Fayetteville, AR (US); Xuan Bac Nguyen, Fayetteville, AR (US); Hugh Churchill, Fayetteville, AR (US)

(73) Assignee: Board of Trustees of the University of Arkansas, Little Rock, AR (US)

(*) Notice: Subject to any disclaimer, the term of this patent is extended or adjusted under 35 U.S.C. 154(b) by 296 days.

(21) Appl. No.: 18/443,058

(22) Filed: Feb. 15, 2024

(65) Prior Publication Data

US 2024/0282086 A1 Aug. 22, 2024

Related U.S. Application Data

(60) Provisional application No. 63/446,331, filed on Feb. 16, 2023.

(51) Int. Cl.
*G06K 9/00* (2022.01)
*G06V 10/77* (2022.01)
(Continued)

(52) U.S. Cl.
CPC ........ *G06V 10/776* (2022.01); *G06V 10/7715* (2022.01); *G06V 10/82* (2022.01); *G06V 20/70* (2022.01)

(58) Field of Classification Search
CPC .. G06V 10/7715; G06V 10/776; G06V 10/82; G06V 20/70
See application file for complete search history.

(56) References Cited

U.S. PATENT DOCUMENTS 8,860,939 B2 10/2014 Kambhampati et al.
10,762,629 B1 9/2020 Burton et al.
(Continued)

FOREIGN PATENT DOCUMENTS

WO WO2021216958 A1 10/2021

OTHER PUBLICATIONS

Ren, Shaoqing, et al. "Faster R-CNN: Towards real-time object detection with region proposal networks." IEEE transactions on pattern analysis and machine intelligence 39.6 (2016): 1137-1149. (Year: 2016).*

(Continued)

*Primary Examiner* — Hadi Akhavannik
(74) *Attorney, Agent, or Firm* — Robert A. Voigt, Jr.; Shackelford, Mckinley & Norton, LLP

(57) ABSTRACT

A computer-implemented method, system, and computer program product for automatically detecting missing annotations (false negative objects) in 2D material detection data sets. Feature maps of an input image (e.g., image of 2D material obtained from optical microscopic images) are extracted using a backbone of a neural network (e.g., Mask-RCNN). Upon receiving such extracted feature maps, a list of object proposals are outputted by a regional proposal network of the neural network. The list of object proposals refer to the list of objects (visual representation of something in the image) in the input image to be annotated. Such a list of object proposals includes positive proposals (indicating that such objects were annotated) and negative proposals (indicating that such objects were not annotated). The false negative proposals (missing annotations) are then predicted from such a list of object proposals by measuring a self-attention between the positive and negative proposals.

21 Claims, 6 Drawing Sheets

(51) Int. Cl.
*G06V 10/776* (2022.01)
*G06V 10/82* (2022.01)
*G06V 20/70* (2022.01)

(56) References Cited

U.S. PATENT DOCUMENTS

| | | | | |
|---|---|---|---|---|
| 11,457,983 | B1 | 10/2022 | Roh et al. | |
| 11,462,324 | B1 | 10/2022 | Roh et al. | |
| 2007/0157325 | A1 | 7/2007 | Mojtahedian et al. | |
| 2019/0156210 | A1* | 5/2019 | He | G06N 3/048 |
| 2020/0342548 | A1 | 10/2020 | Mazed et al. | |
| 2020/0412980 | A1 | 12/2020 | Agranov et al. | |
| 2021/0027098 | A1* | 1/2021 | Ge | G06F 18/217 |
| 2021/0081705 | A1* | 3/2021 | Byiringiro | G06N 3/044 |
| 2021/0201145 | A1 | 7/2021 | Pham et al. | |
| 2021/0244374 | A1 | 8/2021 | Zhao et al. | |
| 2021/0272005 | A1 | 9/2021 | King et al. | |
| 2022/0012890 | A1 | 1/2022 | Wu et al. | |
| 2022/0233160 | A1* | 7/2022 | Cao | G06N 3/0464 |
| 2022/0336511 | A1 | 10/2022 | Barbour et al. | |

OTHER PUBLICATIONS

Hu, Han, et al. "Relation networks for object detection." Proceedings of the IEEE conference on computer vision and pattern recognition. 2018. (Year: 2018).*

Nguyen et al., "Two-dimensional Quantum Material Identification via Self-Attention and Soft-labeling in Deep Learning."; arXiv:2205.15948; May 31, 2022.

Jesus Sanchez-Juarez, Marissa Granados-Baez, Alberto A. Aguilar-Lasserre, and Jaime Cardenas, "Automated system for the detection of 2D materials using digital image processing and deep learning," Opt. Mater. Express 12, 1856-1868 (2022).

Sterbentz, R.M., Haley, K.L. & Island, J.O. Universal image segmentation for optical identification of 2D materials. Sci Rep 11, 5808 (2021). https://doi.org/10.1038/s41598-021-85159-9.

Masubuchi, S., Watanabe, E., Seo, Y. et al. Deep-learning-based image segmentation integrated with optical microscopy for automatically searching for two-dimensional materials. npj 2D Mater Appl 4, 3 (2020). https://doi.org/10.1038/s41699-020-0137-z.

* cited by examiner

AUTOMATICALLY DETECTING FALSE NEGATIVE OBJECTS IN 2D MATERIAL DETECTION DATA SETS

This invention was made with government support under 1906383 awarded by the National Science Foundation. The government has certain rights in the invention.

TECHNICAL FIELD

The present invention relates generally to annotating data sets of images of two-dimensional material detection data sets, and more particularly to automatically detecting false negative objects (failure of detecting target objects) corresponding to missing annotations in the annotated data sets of images of two-dimensional material detection data sets.

BACKGROUND

Two-dimensional (2D) materials are expected to revolutionize the semiconductor industry. Two-dimensional materials refer to materials that are crystalline solids consisting of a single layer of atoms. Currently, such two-dimensional materials have been successfully integrated on silicon microchips and achieved excellent integration density, electronic performance, and yield. In another example, a two-dimensional insulating material called multilayer hexagonal boron nitride was used in CMOS microchips that enabled the fabrication of an artificial neural network with very low power consumption. Such chips can successfully compute spiking neural networks, a key component of current artificial intelligence systems that are increasing in demand.

Material scientists use various methods to measure the properties (e.g., physical thickness) of materials, including 2D materials. For example, various methods have been used to characterize the dimensions of 2D flakes. For instance, physical methods, such as atomic force microscopy (AFM), transmission electron microscopy (TEM), Raman spectroscopy, and white light contrast spectroscopy have been used to characterize the dimensions of 2D flakes. A flake corresponds to a small number of layers of the 2D material. For instance, such 2D flakes may be generated by mechanically exfoliated such flakes from the 2D material. Such 2D flakes are then transferred to a substrate and observed under a microscope. Flakes of 2D materials have exceptional quantum qualities that are not seen in common materials since they only have one to a few atomic layers. As a result, these materials have a tremendous amount of potential for both advanced research and industrial applications.

Unfortunately, such physical methods to characterize the dimensions of 2D flakes are a tedious process, and the experimenter has to observe the flakes to determine their characteristics manually. It requires resources, skill, and time. Recently, deep-learning based approaches to identify and characterize 2D flakes have been proposed and implemented. Depending on the thickness of the flakes deposited on the dielectric layers on the substrate, the optical images observed under the microscope show a gradient of colors. These colors are characteristic of the flake thickness and depend on the material used. For example, hBN (hexagonal boron nitride) flakes have a distinct color profile; similarly, graphene has its own color profile. Based on the relationship among thickness, material, and color, such 2D materials are classified.

In addition to identifying the thickness of the 2D flakes at specific pixels, the color gradient can be used to determine the quality of the 2D flake due to changes in the thickness. With more characteristics of 2D flakes identified based on microscope images, a deep-learning model can be trained to characterize not just the thickness but also the grade and other optical properties of the 2D flakes.

One possible approach for classifying such 2D flakes is using instance segmentation. Instance segmentation is a computer vision task that involves identifying and separating individual objects within an image, including detecting the boundaries of each object and assigning a unique label to each object.

However, instance segmentation is similar to other deep learning models in that it requires a very extensive data set consisting of images of 2D flakes that are fully annotated. That is, all the images of the 2D flakes need to be identified, segmented, and annotated to train the model without false information. In other words, such data sets cannot include missing annotations also known as false negative objects, which refer to the failure in detecting the target objects.

Unfortunately, there is not currently a means for detecting such missing annotations (false negative objects) automatically in 2D material detection data sets.

SUMMARY

In one embodiment of the present disclosure, a computer-implemented method for automatically detecting false negative objects comprises receiving an input image. The method further comprises extracting feature maps of the input image using a backbone of a neural network. The method additionally comprises outputting a list of object proposals by a regional proposal network using the extracted feature maps. Furthermore, the method comprises predicting false negative proposals from the list of object proposals by measuring a self-attention between positive proposals and negative proposals from the list of object proposals.

Other forms of the embodiments of the method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present invention can be obtained when the following detailed description is considered in conjunction with the following drawings, in which.

DETAILED DESCRIPTION

Figure 1:
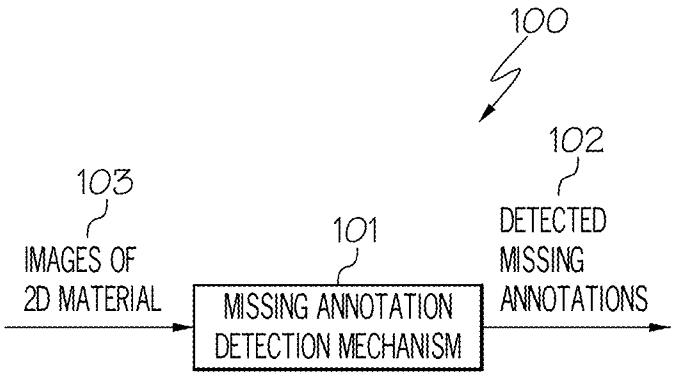
FIG. 1 illustrates a system for practicing the principles of the present disclosure in accordance with an embodiment of the present disclosure.

As stated above, material scientists use various methods to measure the properties (e.g., physical thickness) of materials, including 2D materials. For example, various methods have been used to characterize the dimensions of 2D flakes. For instance, physical methods, such as atomic force microscopy (AFM), transmission electron microscopy (TEM), Raman spectroscopy, and white light contrast spectroscopy have been used to characterize the dimensions of 2D flakes. A flake corresponds to a small number of layers of the 2D material. For instance, such 2D flakes may be generated by mechanically exfoliated such flakes from the 2D material. Such 2D flakes are then transferred to a substrate and observed under a microscope. Flakes of 2D materials have exceptional quantum qualities that are not seen in common materials since they only have one to a few atomic layers. As a result, these materials have a tremendous amount of potential for both advanced research and industrial applications.

Unfortunately, such physical methods to characterize the dimensions of 2D flakes are a tedious process, and the experimenter has to observe the flakes to determine their characteristics manually. It requires resources, skill, and time. Recently, deep-learning based approaches to identify and characterize 2D flakes have been proposed and implemented. Depending on the thickness of the flakes deposited on the dielectric layers on the substrate, the optical images observed under the microscope show a gradient of colors. These colors are characteristic of the flake thickness and depend on the material used. For example, hBN (hexagonal boron nitride) flakes have a distinct color profile; similarly, graphene has its own color profile. Based on the relationship among thickness, material, and color, such 2D materials are classified.

In addition to identifying the thickness of the 2D flakes at specific pixels, the color gradient can be used to determine the quality of the 2D flake due to changes in the thickness. With more characteristics of 2D flakes identified based on microscope images, a deep-learning model can be trained to characterize not just the thickness but also the grade and other optical properties of the 2D flakes.

One possible approach for classifying such 2D flakes is using instance segmentation. Instance segmentation is a computer vision task that involves identifying and separating individual objects within an image, including detecting the boundaries of each object and assigning a unique label to each object.

However, instance segmentation is similar to other deep learning models in that it requires a very extensive data set consisting of images of 2D flakes that are fully annotated. That is, all the images of the 2D flakes need to be identified, segmented, and annotated to train the model without false information. In other words, such data sets cannot include missing annotations also known as false negative objects, which refer to the failure in detecting the target objects.

Unfortunately, there is not currently a means for detecting such missing annotations (false negative objects) automatically in 2D material detection data sets.

The embodiments of the present disclosure provide a means for detecting missing annotations (false negative objects) automatically in 2D material detection data sets by extracting feature maps of an input image (e.g., image of 2D material, such as a 2D flake, obtained from optical microscopic images) using a backbone (responsible for extracting and encoding features from the input data) of a neural network (e.g., Mask-RCNN, which is an instance segmentation technique). Feature maps, as used herein, represent the presence or absence of specific features at different spatial locations in the input image. Upon receiving such extracted feature maps, a list of object proposals are outputted by a regional proposal network (fully convolution network that simultaneously predicts object bounds and objectness scores at each position) of the neural network. The list of object proposals, as used herein, refer to the list of objects (visual representation of something in the image) in the input image to be annotated. Such a list of object proposals includes positive proposals (indicating that such objects were annotated) and negative proposals (indicating that such objects were not annotated). The false negative proposals (missing annotations) are then predicted from such a list of object proposals by measuring a self-attention between the positive and negative proposals, such as via a softmax function using an attention map. Attention, as used herein, refers to the weight or score of each proposal, indicating how much it contributes to the final representation or prediction. An attention map, as used herein, refers to a matrix or map where each row and column corresponds to a positive or negative proposal, and each cell shows the attention score between them. If the attention score for the negative proposal exceeds a threshold value, then such a sample is deemed to be false negative thereby detecting a missing annotation. In this manner, missing annotations (false negative objects) are automatically detected in 2D material detection data sets. These and other features will be discussed in greater detail below.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a system 100 for practicing the principles of the present disclosure. System 100 includes a missing annotation detection mechanism 101 configured to detect missing annotations 102 from images 103 of 2D material, such as images of 2D flakes.

A description of the software components of missing annotation detection mechanism 101 used for automatically detecting false negative objects (missing annotations) in 2D material detection data sets is provided below in connection with FIG. 2. A description of the hardware configuration of missing annotation detection mechanism 101 is provided further below in connection with FIG. 3.

Figure 2:
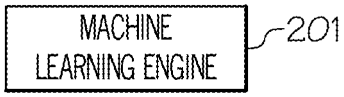
FIG. 2 is a diagram of the software components of the missing annotation detection mechanism used for automatically detecting false negative objects (missing annotations) in 2D material detection data sets in accordance with an embodiment of the present disclosure.

Referring to FIG. 2, FIG. 2 is a diagram of the software components of missing annotation detection mechanism 101 used for automatically detecting false negative objects (missing annotations) in 2D material detection data sets in accordance with an embodiment of the present disclosure.

As shown in FIG. 2, missing annotation detection mechanism 101 includes a machine learning engine 201 configured to build and train a model to automatically detect false negative objects (missing annotations) in 2D material detection data sets.

In one embodiment, machine learning engine 201 of missing annotation detection mechanism 101 builds and trains a model to automatically detect false negative objects (missing annotations) in 2D material detection data sets using a machine learning algorithm, such as a neural network. In one embodiment, such a neural network is a Mask-RCNN.

In one embodiment, Mask-RCNN includes three main components, such as the backbone (B), the region proposal network (RPN) and the region of interest head (ROI). The backbone is responsible for extracting and encoding features from the input data. The region proposal network corresponds to a fully convolution network that simultaneously predicts object bounds and objectness scores at each position. The region of interest head is a neural-net layer used for object detection tasks.

In one embodiment, Mask-RCNN is a two-stage framework where the results of the first stage are passed as input to the second stage. If the first stage is not good enough, the performance of the second stage will fall apart. The first stage includes RPN that also nominates the potential objects (visual representation of something in the image) and their shapes represented by anchors (also referred to as "anchor boxes"), which are predefined bounding boxes used in object detection algorithms to help identify objects in an image. Typically, anchors are chosen based on the size and aspect ratios of the objects that the algorithm is trying to detect.

In the case of missing annotations, such objects do not have bounding boxes or anchors. As a result, RPN is confused by treating these potential objects as a background (e.g., part of a scene or picture that is behind a main figure or object or farthest from a viewer) while some similar objects are considered as a foreground (e.g., objects nearest to the viewer and form the main part of the scene or picture). In other words, missing annotations are a form of existing false negatives (failure to detect target objects) and lead to lower recall of proposing potential objects. As a result, the second stage will be negatively influenced.

As discussed in further detail below, the principles of the present disclosure address the missing annotation problem using the RPN to enhance the confidence of the proposed objects and subsequently improve the next stage and overall performance. In particular, a further description of these and other features is provided below in connection with the discussion of the method for automatically detecting false negative objects using the RPN to enhance the confidence of the proposed objects and subsequently improve the next stage and overall performance.

Prior to the discussion of the method for automatically detecting false negative objects using the RPN to enhance the confidence of the proposed objects and subsequently improve the next stage and overall performance, a description of the hardware configuration of missing annotation detection mechanism 101 (FIG. 1) is provided below in connection with FIG. 3.

Figure 3:
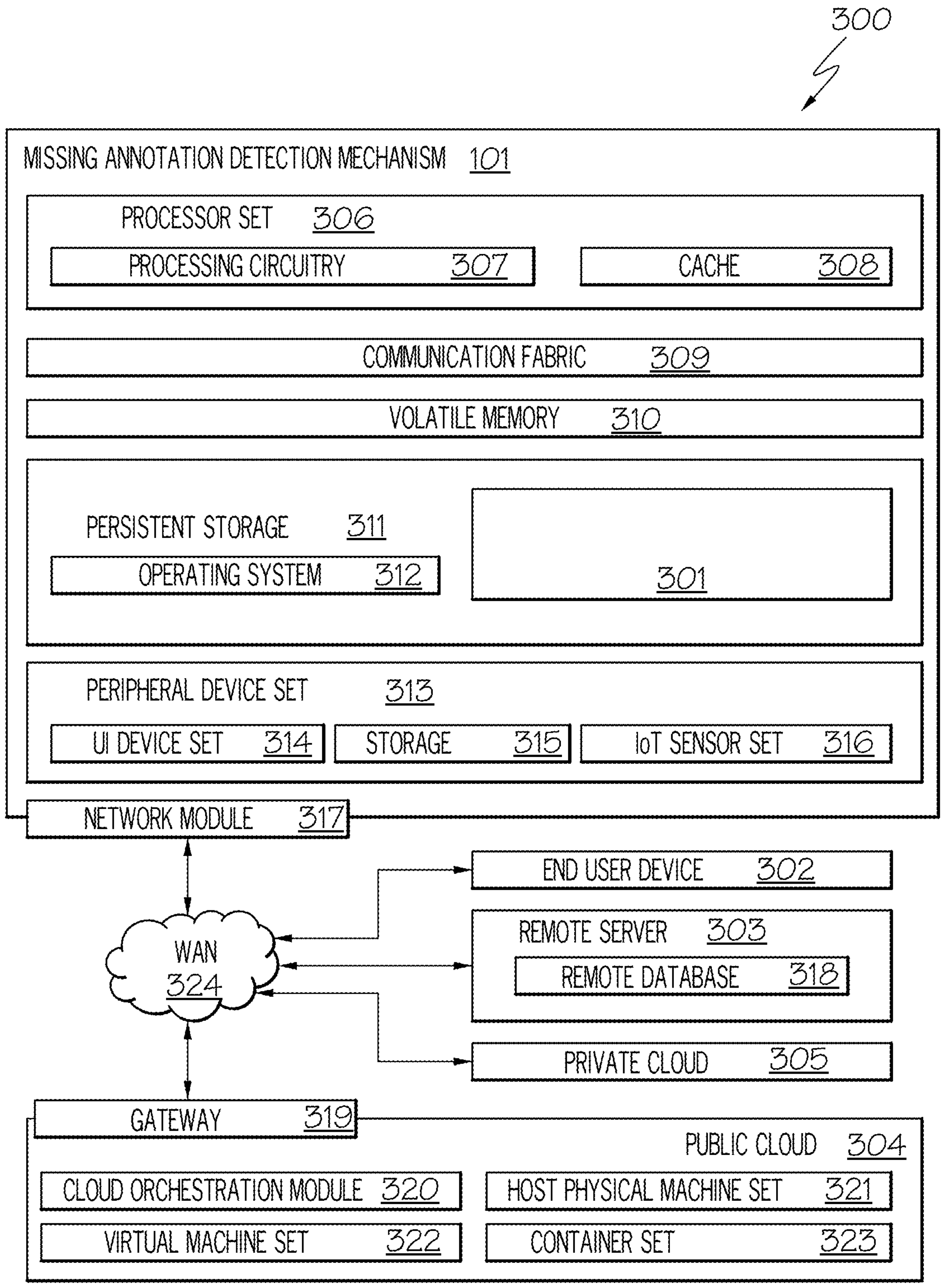
FIG. 3 illustrates an embodiment of the present disclosure of the hardware configuration of the missing annotation detection mechanism which is representative of a hardware environment for practicing the present disclosure.

Referring now to FIG. 3, in conjunction with FIG. 1, FIG. 3 illustrates an embodiment of the present disclosure of the hardware configuration of missing annotation detection mechanism 101 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (computer code for automatically detecting false negative objects (missing annotations), which is stored in block 301) involved in performing the disclosed methods, such as automatically detecting false negative objects (missing annotations). In addition to block 301, computing environment 300 includes, for example, missing annotation detection mechanism 101, network 324, such as a wide area network (WAN), end user device (EUD) 302, remote server 303, public cloud 304, and private cloud 305. In this embodiment, missing annotation detection mechanism 101 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Missing annotation detection mechanism 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically missing annotation detection mechanism 101, to keep the presentation as simple as possible. Missing annotation detection mechanism 101 may be located in a cloud, even though it is not shown in a cloud in FIG. 3. On the other hand, missing annotation detection mechanism 101 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto missing annotation detection mechanism 101 to cause a series of operational steps to be performed by processor set 306 of missing annotation detection mechanism 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 308 and the other storage media discussed below. The program instructions, and associated data, are accessed by processor set 306 to control and direct performance of the disclosed methods. In computing environment 300, at least some of the instructions for performing the disclosed methods may be stored in block 301 in persistent storage 311.

Communication fabric 309 is the signal conduction paths that allow the various components of missing annotation detection mechanism 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In missing annotation detection mechanism 101, the volatile memory 310 is located in a single package and is internal to missing annotation detection mechanism 101, but, alternatively or additionally, the volatile memory may be distributed over multiple packages and/or located externally with respect to missing annotation detection mechanism 101.

Persistent Storage 311 is any form of non-volatile storage for computers that is now known or to be developed in the future. The non-volatility of this storage means that the stored data is maintained regardless of whether power is being supplied to missing annotation detection mechanism 101 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the disclosed methods.

Peripheral device set 313 includes the set of peripheral devices of missing annotation detection mechanism 101. Data communication connections between the peripheral devices and the other components of missing annotation detection mechanism 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where missing annotation detection mechanism 101 is required to have a large amount of storage (for example, where missing annotation detection mechanism 101 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows missing annotation detection mechanism 101 to communicate with other computers through WAN 324. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the disclosed methods can typically be downloaded to missing annotation detection mechanism 101 from an external computer or external storage device through a network adapter card or network interface included in network module 317.

WAN 324 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates missing annotation detection mechanism 101), and may take any of the forms discussed above in connection with missing annotation detection mechanism 101. EUD 302 typically receives helpful and useful data from the operations of missing annotation detection mechanism 101. For example, in a hypothetical case where missing annotation detection mechanism 101 is designed to provide a recommendation to an end user, this recommendation would typically be communicated from network module 317 of missing annotation detection mechanism 101 through WAN 324 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to missing annotation detection mechanism 101. Remote server 303 may be controlled and used by the same entity that operates missing annotation detection mechanism 101. Remote server 303 represents the machine(s) that collect and store helpful and useful data for use by other computers, such as missing annotation detection mechanism 101. For example, in a hypothetical case where missing annotation detection mechanism 101 is designed and programmed to provide a recommendation based on historical data, then this historical data may be provided to missing annotation detection mechanism 101 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 324.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 324 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed herein for automatically detecting false negative objects (missing annotations). In one embodiment, such components may be implemented in hardware. The functions discussed above performed by such components are not generic computer functions. As a result, missing annotation detection mechanism 101 is a particular machine that is the result of implementing specific, non-generic computer functions.

In one embodiment, the functionality of such software components of missing annotation detection mechanism 101, including the functionality for automatically detecting false negative objects (missing annotations), may be embodied in an application specific integrated circuit.

As stated above, material scientists use various methods to measure the properties (e.g., physical thickness) of materials, including 2D materials. For example, various methods have been used to characterize the dimensions of 2D flakes. For instance, physical methods, such as atomic force microscopy (AFM), transmission electron microscopy (TEM), Raman spectroscopy, and white light contrast spectroscopy have been used to characterize the dimensions of 2D flakes. A flake corresponds to a small number of layers of the 2D material. For instance, such 2D flakes may be generated by mechanically exfoliated such flakes from the 2D material. Such 2D flakes are then transferred to a substrate and observed under a microscope. Flakes of 2D materials have exceptional quantum qualities that are not seen in common materials since they only have one to a few atomic layers. As a result, these materials have a tremendous amount of potential for both advanced research and industrial applications. Unfortunately, such physical methods to characterize the dimensions of 2D flakes are a tedious process, and the experimenter has to observe the flakes to determine their characteristics manually. It requires resources, skill, and time. Recently, deep-learning based approaches to identify and characterize 2D flakes have been proposed and implemented. Depending on the thickness of the flakes deposited on the dielectric layers on the substrate, the optical images observed under the microscope show a gradient of colors. These colors are characteristic of the flake thickness and depend on the material used. For example, hBN (hexagonal boron nitride) flakes have a distinct color profile; similarly, graphene has its own color profile. Based on the relationship among thickness, material, and color, such 2D materials are classified. In addition to identifying the thickness of the 2D flakes at specific pixels, the color gradient can be used to determine the quality of the 2D flake due to changes in the thickness. With more characteristics of 2D flakes identified based on microscope images, a deep-learning model can be trained to characterize not just the thickness but also the grade and other optical properties of the 2D flakes. One possible approach for classifying such 2D flakes is using instance segmentation. Instance segmentation is a computer vision task that involves identifying and separating individual objects within an image, including detecting the boundaries of each object and assigning a unique label to each object. However, instance segmentation is similar to other deep learning models in that it requires a very extensive data set consisting of images of 2D flakes that are fully annotated. That is, all the images of the 2D flakes need to be identified, segmented, and annotated to train the model without false information. In other words, such data sets cannot include missing annotations also known as false negative objects, which refer to the failure in detecting the target objects. Unfortunately, there is not currently a means for detecting such missing annotations (false negative objects) automatically in 2D material detection data sets.

Figure 4:
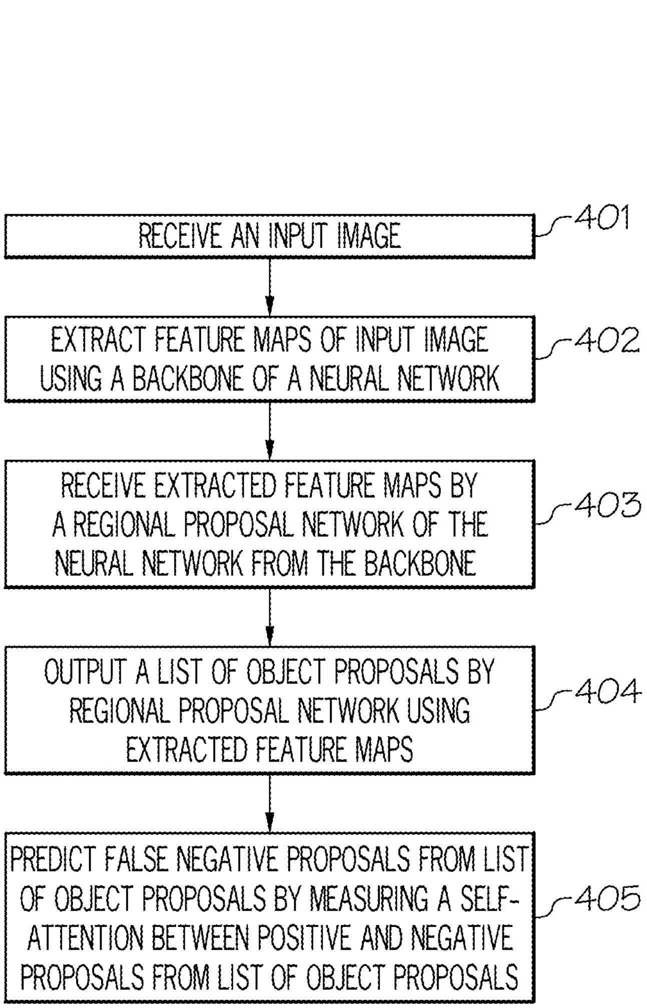
FIG. 4 is a flowchart of a method for automatically detecting false negative objects (missing annotations) in accordance with an embodiment of the present disclosure.
Figure 5:
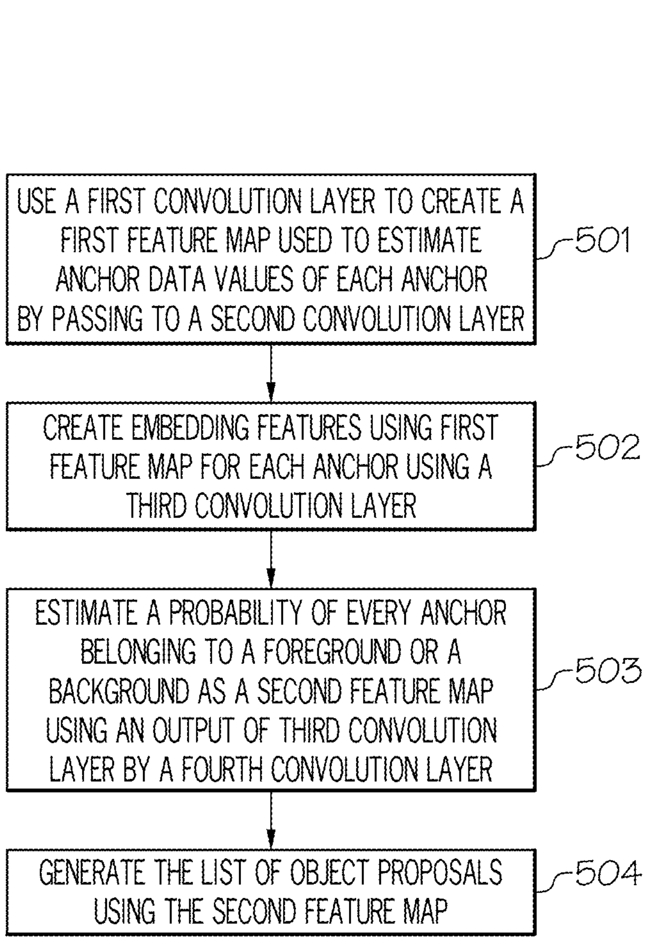
FIG. 5 is a flowchart of a method for outputting a list of object proposals by the regional proposal network of the neural network in accordance with an embodiment of the present disclosure.
Figure 6:
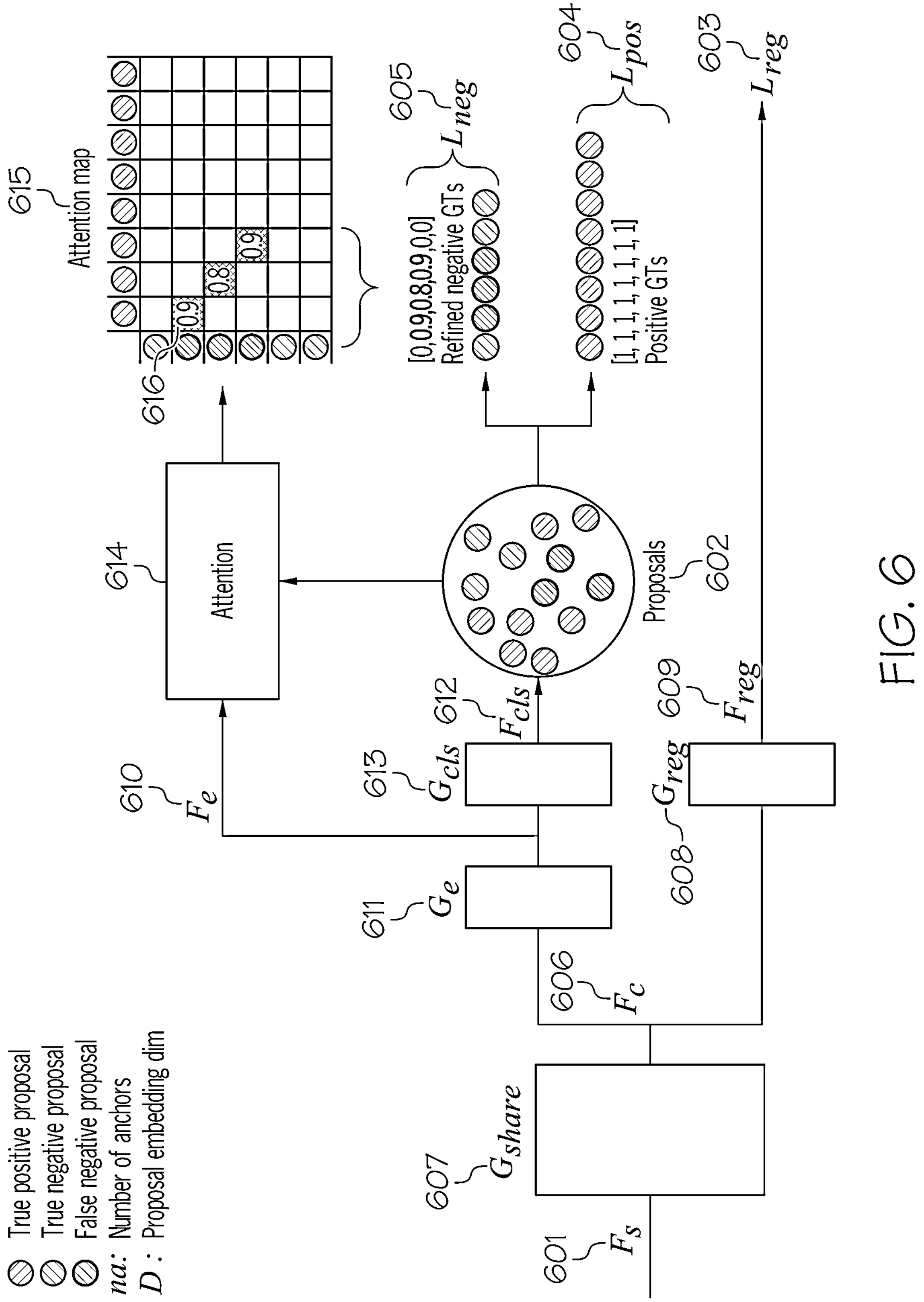
FIG. 6 illustrates the regional proposal network outputting a list of object proposals in accordance with an embodiment of the present disclosure.
Figure 7:
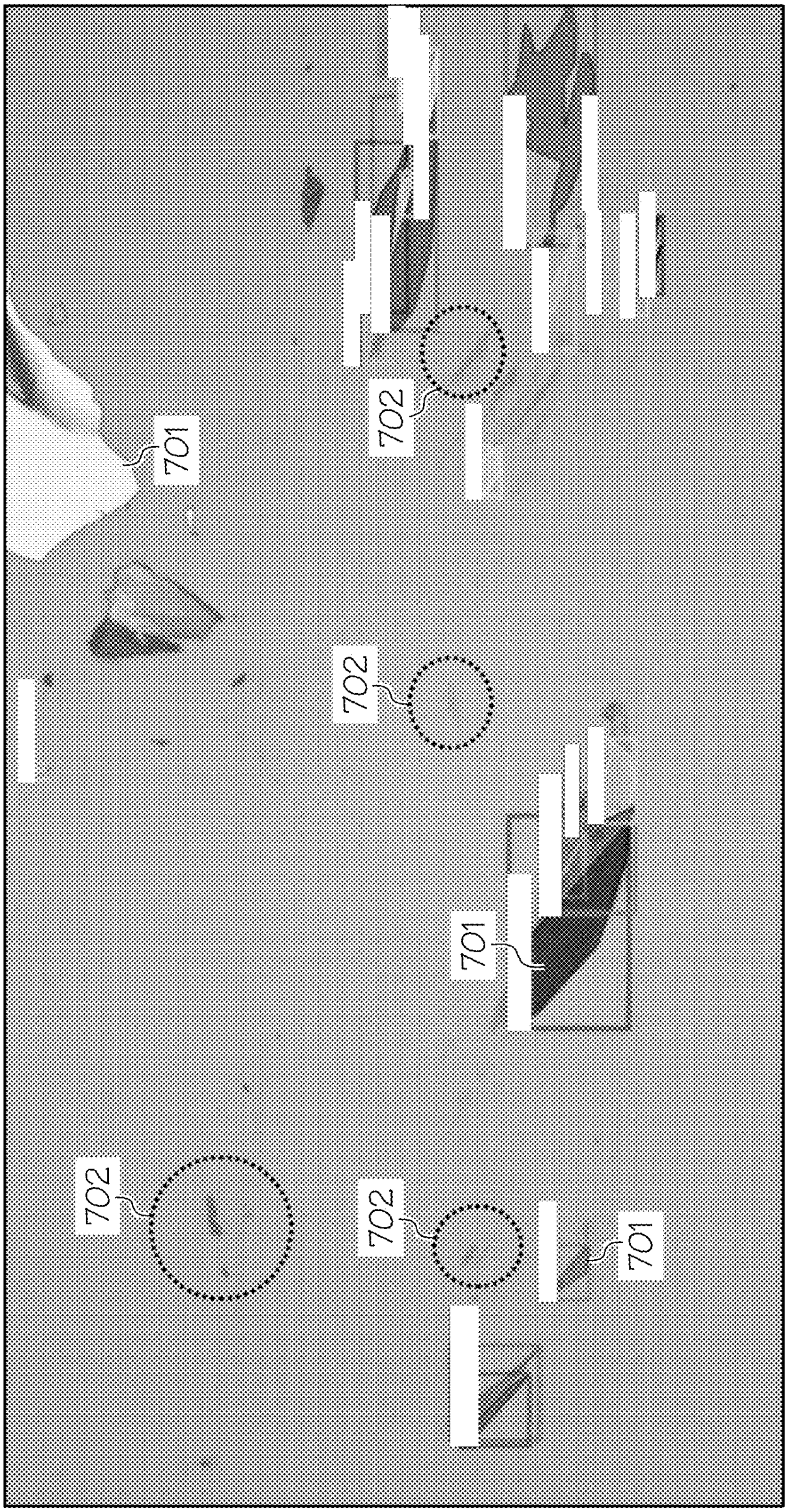
FIG. 7 illustrates identifying false negative objects without annotations in the sample of graphene objects in accordance with an embodiment of the present disclosure.

The embodiments of the present disclosure provide a means for detecting missing annotations (false negative objects) automatically in 2D material detection data sets as discussed below in connection with FIGS. 4-7. FIG. 4 is a flowchart of a method for automatically detecting false negative objects (missing annotations). FIG. 5 is a flowchart of a method for outputting a list of object proposals by the regional proposal network of the neural network. FIG. 6 illustrates the regional proposal network outputting a list of object proposals. FIG. 7 illustrates identifying false negative objects without annotations in the sample of graphene objects.

As stated above, FIG. 4 is a flowchart of a method 400 for automatically detecting false negative objects (missing annotations) in accordance with an embodiment of the present disclosure.

Referring to FIG. 4, in conjunction with FIGS. 1-3, in step 401, missing annotation detection mechanism 101 receives an input image 103, such as an image of 2D material (e.g., hBN, Graphene, $MoS_2$, and $WTe_2$), including an image of 2D flakes. In one embodiment, such an input image corresponds to images 103 of 2D material obtained from optical microscopic images.

In step 402, the backbone (B) (responsible for extracting and encoding features from the input data) of the neural network (e.g., Mask-RCNN, which is an instance segmentation technique) extracts feature maps of the input image. Feature maps, as used herein, represent the presence or absence of specific features at different spatial locations in the input image.

Let $I \in \mathbb{R}^{HxWxC}$ be the input image, where H, W, C are the height, width, and number of channels correspondingly. The backbone (B) of the neural network (e.g., Mask-RCNN) extracts feature maps of I denoted as Fs=B(I), $Fs \in \mathbb{R}^{HsxWsxCs}$ where s is the scale and $H_s$=H/s and $W_s$=W/s. An illustration of extracting feature maps of the input image is provided in FIG. 6, which is discussed further below.

In step 403, the regional proposal network (RPN) (fully convolution network that simultaneously predicts object bounds and objectness scores at each position) of the neural network receives the extracted feature maps from the backbone (B) of the neural network.

In step 404, the regional proposal network (RPN) of the neural network outputs a list of object proposal using the extracted feature maps.

The list of object proposals, as used herein, refer to the list of objects (visual representation of something in the image) in the input image to be annotated. Such a list of object proposals includes positive proposals (indicating that such objects were annotated) and negative proposals (indicating that such objects were not annotated).

A discussion regarding outputting a list of object proposals is provided below in connection with FIGS. 5-6.

FIG. 5 is a flowchart of a method 500 for outputting a list of object proposals by the regional proposal network of the neural network in accordance with an embodiment of the present disclosure. FIG. 6 illustrates the regional proposal network outputting a list of object proposals in accordance with an embodiment of the present disclosure.

Referring to FIG. 5, in conjunction with FIGS. 1-4 and 6, in step 501, a first convolution layer (e.g., $G_{share}$ 607) is used to create a first feature map ($F_c$ 606) used to estimate the anchor data values of each anchor (e.g., $F_{reg}$ 609) by passing to a second convolution layer (e.g., $G_{reg}$ 608) as illustrated in FIG. 6. An "anchor," also referred to as "anchor boxes," as used herein, are predefined bounding boxes used in object detection algorithms to help identify objects in an image.

Referring to FIG. 6, in the first stage, RPN receives $F_s$ 601 as an input and outputs a list of object proposals 602 $P_s$.

$$P_S = RPN(F_S) \qquad (1)$$

Let na be the number of anchors, then the total number of proposals 602 that can be generated is $|P_s|=H_i \times W_i \times na$. In one embodiment, $P_s$ is split into two subsets: $P_{pos}$ for positive proposals and $P_{neg}$ for negative proposals.

$$P_s = P_{pos} + P_{neg},\ |P_s| = H_i \times W_i \times na = |P_{pos}| + |P_{neg}| \tag{2}$$

The objectives of RPN are: (1) predicting if a proposal is foreground or background; and (2) estimating anchor delta, referring to the difference between two anchor values.

$$\mathcal{L}_{RPN} = \mathcal{L}_{cls} + \mathcal{L}_{reg} = \frac{1}{|\mathcal{P}_s|} \sum_{p_i \in \mathcal{P}_s} L_{cls}(p_i, \hat{p}_i) + \frac{1}{|\mathcal{P}_{neg}|} \sum_{p_i \in \mathcal{P}_{neg}} L_{reg}(t_i, \hat{t}_i) \tag{3}$$

where $L_{cls}$ and $L_{reg}$ 603 are the loss functions. $p_i$ is the probability the anchor $i^{th}$ is foreground while $\hat{p}_i$ is the ground truth. Similarly, $t_i$ and $\hat{t}_i$ are predictions and ground truth of the anchor size, respectively. It is noted that $P_s$ includes both negative and positive proposals. Thus, in Eq. (3), $L_{reg}$ 603 encounters the positive proposals only, while $L_{cls}$ involves all type of proposals. The $L_{cls}$ can be reformulated as follows, $L_{cls}=L_{pos}$ (604)+$L_{neg}$ (605)

$$l = \frac{1}{|\mathcal{P}_{pos}|} \sum_{p_i \in \mathcal{P}_{pos}} L_{cls}(p_i, \hat{p}_i) + \frac{1}{|\mathcal{P}_{neg}|} \sum_{p_i \in \mathcal{P}_{neg}} L_{cls}(p_j, \hat{p}_j) \tag{4}$$

It is clear that $\forall p_i \in P_{pos}$, $\hat{p}_i=1$ and $\forall p_i \in P_{neg}$, $\hat{p}_j=0$. However, due to missing annotations, it leads to $\exists p_j \in P_{neg}$ such that $\hat{p}_j=1$, where $p_j$ corresponds to the false negative samples (missing annotations).

As discussed herein, missing annotation detection mechanism 101 detects such false negative samples automatically. Furthermore, as discussed below, the principles of the present disclosure utilize an alternative loss function that uses a soft label for these samples to help reduce gradient impacts on the overall architecture. As in Eq. (1), $F_s$ 601 is the input and RPN is designed as follows, $F_c=G_{share}(F_s)$, where $G_{share}$ 607 corresponds to the first convolution network discussed herein for creating $F_c$ 606, which corresponds to the first feature map discussed herein.

$F_{reg}=G_{reg}(F_c)$, where $G_{reg}$ 608 corresponds to the second convolution network discussed herein for creating feature map $F_{reg}$ 609 of the estimated anchor data values of each anchor.

$F_e=G_e(F_c)$, where $G_e$ 611 corresponds to the third convolution network discussed herein for creating embedding features $F_e$ 610 for each anchor.

$F_{cls}=G_{cls}(F_e)$, where $G_{cls}$ 613 corresponds to the fourth convolution layer for creating feature map $F_{cls}$ 612 corresponding to the estimated probability of every anchor belonging to a foreground or a background.

In one embodiment, the convolution layer $G_{share}$ 607 is used to create a feature map $F_c$ 606. It is used to estimate anchor delta values of each anchor (feature map $F_{reg}$ 609) by passing to convolution layer $G_{reg}$ 608.

Returning to FIG. 5, in conjunction with FIGS. 1-4 and 6, in step 502, a third convolution layer $G_e$ 611 of RPN creates embedding features $F_e$ 610 for each anchor using the first feature map, $F_c$ 606, as illustrated in FIG. 6.

In step 503, the fourth convolution layer $G_{cls}$ 613 estimates a probability of every anchor belonging to a foreground or a background as a second feature map (see feature map $F_{cls}$ 612) using the output of third convolution layer $G_e$ 611.

It is noted that $F_e \in \mathbb{R}^{Hc \times Wc \times (na \times D)}$ and $F_{cls} \in \mathbb{R}^{Hcls \times Wcls \times na}$, where D is the dimension of the embedding feature and na is the number of anchors. In one embodiment, $G_{cls}$ 613 is designed as a convolution with kernel size and stride as 1 to make sure that: $H_e=W_{cls}$, $H_w=H_{cls}$ and every anchor has its corresponding embedding.

In step 504, fourth convolution layer $G_{cls}$ 613 generates a list of object proposals 602 using the second feature map, $F_{cls}$ 612.

The proposal set $P_s$ is generated from $F_{cls}$, and proposals can be identified as either positive or negative ones.

Returning to FIG. 4, in conjunction with FIGS. 1-3 and 5-6, in step 405, RPN of the neural network (e.g., Mask-RCNN) predicts the false negative proposals (e.g., missing annotations) from the list of object proposals 602 by measuring a self-attention (see element 614) between the positive and negative proposals from the list of object proposals 602.

In one embodiment, the self-attention between the positive and negative proposals from the list of object proposals 602 is performed via a softmax function using an attention map 615. Attention, as used herein, refers to the weight or score of each proposal, indicating how much it contributes to the final representation or prediction. An attention map 615, as used herein, refers to a matrix or map where each row and column corresponds to a positive or negative proposal, and each cell shows the attention score 616 between them. If attention score 616 for a negative proposal exceeds a threshold, then such a sample is deemed to be false negative.

In one embodiment, the self-attention is measured between the two sets of proposal $P_{pos}$ and $P_{neg}$ as follows, $$A = \text{softmax}(Norm(F_{neg}) \odot Norm(F_{pos})) \tag{5}$$

where $F_{pos} \in \mathbb{R}^{Npos \times D}$, $F_{neg} \in \mathbb{R}^{Nneg \times D}$ are the feature sets of all positive and negative proposals, respectively. Norm is denoted as the normalization function and $\odot$ is matrix multiplication. $A \in \mathbb{R}^{Nneg \times Npos}$ is attention map 615, $A_{ij}$ represents attention score 616 between the $i^{th}$ negative and $j^{th}$ positive sample and $\sum_j A_{ij}=1$. A negative proposal with a high $A_{ij}$ score corresponds to a false negative proposal; whereas, a low $A_{ij}$ score for the negative proposal corresponds to a true negative proposal. In one embodiment, attention score 616 is compared to a threshold value, t, which is used to determine if the negative proposal is a true negative proposal or a false proposal. For example, if attention score, $A_{ij}$ 616, has a value that exceeds the threshold value, t, then the negative proposal is deemed to be a false negative proposal.

Furthermore, the loss function, $L_{neg}$ 605 for negative proposals is reformulated in order to reduce the negative impact of these objects contributing to the overall loss function.

$$L_{neg}(p_i, \hat{p}_i) = \begin{cases} L_{cls}(p_i, \max(A_i)), \text{ if } \max(A_i) \geq t \\ L_{cls}(p_i, 0), \text{ if } \max(A_i) < t \end{cases} \tag{6}$$

Referring now to FIG. 7, FIG. 7 illustrates identifying false negative objects without annotations in the sample of graphene objects in accordance with an embodiment of the present disclosure.

As shown in FIG. 7, a sample of various graphene objects 701 from a data set is captured from an input image. Using the principles of the present disclosure, false negative proposals (missing annotations) 702 are identified.

In this manner, missing annotations (false negative objects) are automatically detected in 2D material detection data sets. That is, in this manner, missing annotations in instance segmentation in 2D quantum materials (e.g., hBN, Graphene, $MoS_2$, and $WTe_2$) are detected. Furthermore, a new attention-based loss strategy is utilized to reduce the negative impact of these objects contributing to the overall loss function.

Furthermore, the principles of the present disclosure assist in localizing the location of 2D quantum materials using optical microscopy.

Furthermore, the principles of the present disclosure improve the technology or technical field involving annotating data sets of images of two-dimensional material detection data sets.

As discussed above, material scientists use various methods to measure the properties (e.g., physical thickness) of materials, including 2D materials. For example, various methods have been used to characterize the dimensions of 2D flakes. For instance, physical methods, such as atomic force microscopy (AFM), transmission electron microscopy (TEM), Raman spectroscopy, and white light contrast spectroscopy have been used to characterize the dimensions of 2D flakes. A flake corresponds to a small number of layers of the 2D material. For instance, such 2D flakes may be generated by mechanically exfoliated such flakes from the 2D material. Such 2D flakes are then transferred to a substrate and observed under a microscope. Flakes of 2D materials have exceptional quantum qualities that are not seen in common materials since they only have one to a few atomic layers. As a result, these materials have a tremendous amount of potential for both advanced research and industrial applications. Unfortunately, such physical methods to characterize the dimensions of 2D flakes are a tedious process, and the experimenter has to observe the flakes to determine their characteristics manually. It requires resources, skill, and time. Recently, deep-learning based approaches to identify and characterize 2D flakes have been proposed and implemented. Depending on the thickness of the flakes deposited on the dielectric layers on the substrate, the optical images observed under the microscope show a gradient of colors. These colors are characteristic of the flake thickness and depend on the material used. For example, hBN (hexagonal boron nitride) flakes have a distinct color profile; similarly, graphene has its own color profile. Based on the relationship among thickness, material, and color, such 2D materials are classified. In addition to identifying the thickness of the 2D flakes at specific pixels, the color gradient can be used to determine the quality of the 2D flake due to changes in the thickness. With more characteristics of 2D flakes identified based on microscope images, a deep-learning model can be trained to characterize not just the thickness but also the grade and other optical properties of the 2D flakes. One possible approach for classifying such 2D flakes is using instance segmentation. Instance segmentation is a computer vision task that involves identifying and separating individual objects within an image, including detecting the boundaries of each object and assigning a unique label to each object. However, instance segmentation is similar to other deep learning models in that it requires a very extensive data set consisting of images of 2D flakes that are fully annotated. That is, all the images of the 2D flakes need to be identified, segmented, and annotated to train the model without false information. In other words, such data sets cannot include missing annotations also known as false negative objects, which refer to the failure in detecting the target objects. Unfortunately, there is not currently a means for detecting such missing annotations (false negative objects) automatically in 2D material detection data sets.

Embodiments of the present disclosure improve such technology by extracting feature maps of an input image (e.g., image of 2D material, such as a 2D flake, obtained from optical microscopic images) using a backbone (responsible for extracting and encoding features from the input data) of a neural network (e.g., Mask-RCNN, which is an instance segmentation technique). Feature maps, as used herein, represent the presence or absence of specific features at different spatial locations in the input image. Upon receiving such extracted feature maps, a list of object proposals are outputted by a regional proposal network (fully convolution network that simultaneously predicts object bounds and objectness scores at each position) of the neural network. The list of object proposals, as used herein, refer to the list of objects (visual representation of something in the image) in the input image to be annotated. Such a list of object proposals includes positive proposals (indicating that such objects were annotated) and negative proposals (indicating that such objects were not annotated). The false negative proposals (missing annotations) are then predicted from such a list of object proposals by measuring a self-attention between the positive and negative proposals, such as via a softmax function using an attention map. Attention, as used herein, refers to the weight or score of each proposal, indicating how much it contributes to the final representation or prediction. An attention map, as used herein, refers to a matrix or map where each row and column corresponds to a positive or negative proposal, and each cell shows the attention score between them. If the attention score for the negative proposal exceeds a threshold value, then such a sample is deemed to be false negative thereby detecting a missing annotation. In this manner, missing annotations (false negative objects) are automatically detected in 2D material detection data sets. Furthermore, in this manner, there is an improvement in the technical field involving annotating data sets of images of two-dimensional material detection data sets.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for automatically detecting false negative objects, the method comprising:

receiving an input image from a training data set of optical microscope images;

extracting feature maps of said input image using a backbone of a neural network;

outputting a list of object proposals by a regional proposal network using said extracted feature maps, wherein said list of object proposals includes positive proposals corresponding to annotated objects and negative proposals corresponding to unannotated objects; and predicting false negative proposals from said list of object proposals by measuring a self-attention between positive proposals and negative proposals from said list of object proposals, wherein said self-attention is measured using an attention map, wherein an attention score is a result of measuring said self-attention using said attention map, wherein said attention score of a negative proposal is compared to a threshold value to predict a false negative proposal.

2. The method as recited in claim 1 further comprising:

using a first convolution layer to create a first feature map used to estimate anchor data values of each anchor by passing to a second convolution layer.

3. The method as recited in claim 2 further comprising:

creating embedding features using said first feature map for each anchor using a third convolution layer.

4. The method as recited in claim 3 further comprising:

estimating a probability of every anchor belonging to a foreground or a background as a second feature map using an output of said third convolution layer by a fourth convolution layer.

5. The method as recited in claim 4 further comprising:

generating said list of object proposals using said second feature map.

6. The method as recited in claim 1, wherein said self-attention is measured via a softmax function.

7. The method as recited in claim 1, wherein a soft label is used for said predicted false negative proposals.

8. A computer program product for automatically detecting false negative objects, the computer program product comprising one or more computer readable storage mediums having program code embodied therewith, the program code comprising programming instructions for:

receiving an input image from a training data set of optical microscope images;

extracting feature maps of said input image using a backbone of a neural network;

outputting a list of object proposals by a regional proposal network using said extracted feature maps, wherein said list of object proposals includes positive proposals corresponding to annotated objects and negative proposals corresponding to unannotated objects; and predicting false negative proposals from said list of object proposals by measuring a self-attention between positive proposals and negative proposals from said list of object proposals, wherein said self-attention is measured using an attention map, wherein an attention score is a result of measuring said self-attention using said attention map, wherein said attention score of a negative proposal is compared to a threshold value to predict a false negative proposal.

9. The computer program product as recited in claim 8, wherein the program code further comprises the programming instructions for:

using a first convolution layer to create a first feature map used to estimate anchor data values of each anchor by passing to a second convolution layer.

10. The computer program product as recited in claim 9, wherein the program code further comprises the programming instructions for:

creating embedding features using said first feature map for each anchor using a third convolution layer.

11. The computer program product as recited in claim 10, wherein the program code further comprises the programming instructions for:

estimating a probability of every anchor belonging to a foreground or a background as a second feature map using an output of said third convolution layer by a fourth convolution layer.

12. The computer program product as recited in claim 11, wherein the program code further comprises the programming instructions for:

generating said list of object proposals using said second feature map.

13. The computer program product as recited in claim 8, wherein said self-attention is measured via a softmax function.

14. The computer program product as recited in claim 8, wherein a soft label is used for said predicted false negative proposals.

15. A system, comprising:

a memory for storing a computer program for automatically detecting false negative objects; and a processor connected to said memory, wherein said processor is configured to execute program instructions of the computer program comprising:

receiving an input image;

receiving an input image from a training data set of optical microscope images;

extracting feature maps of said input image using a backbone of a neural network;

outputting a list of object proposals by a regional proposal network using said extracted feature maps, wherein said list of object proposals includes positive proposals corresponding to annotated objects and negative proposals corresponding to unannotated objects; and predicting false negative proposals from said list of object proposals by measuring a self-attention between positive proposals and negative proposals from said list of object proposals, wherein said self-attention is measured using an attention map, wherein an attention score is a result of measuring said self-attention using said attention map, wherein said attention score of a negative proposal is compared to a threshold value to predict a false negative proposal.

16. The system as recited in claim 15, wherein the program instructions of the computer program further comprise:

using a first convolution layer to create a first feature map used to estimate anchor data values of each anchor by passing to a second convolution layer.

17. The system as recited in claim 16, wherein the program instructions of the computer program further comprise:

creating embedding features using said first feature map for each anchor using a third convolution layer.

18. The system as recited in claim 17, wherein the program instructions of the computer program further comprise:

estimating a probability of every anchor belonging to a foreground or a background as a second feature map using an output of said third convolution layer by a fourth convolution layer.

19. The system as recited in claim 18, wherein the program instructions of the computer program further comprise:

generating said list of object proposals using said second feature map.

20. The system as recited in claim 15, wherein said self-attention is measured via a softmax function.

21. The system as recited in claim 15, wherein a soft label is used for said predicted false negative proposals.

* * * * *